D. H. WEIR.
CHAIN LOCK.
APPLICATION FILED AUG. 27, 1917.
1,291,312.
Patented Jan. 14, 1919.
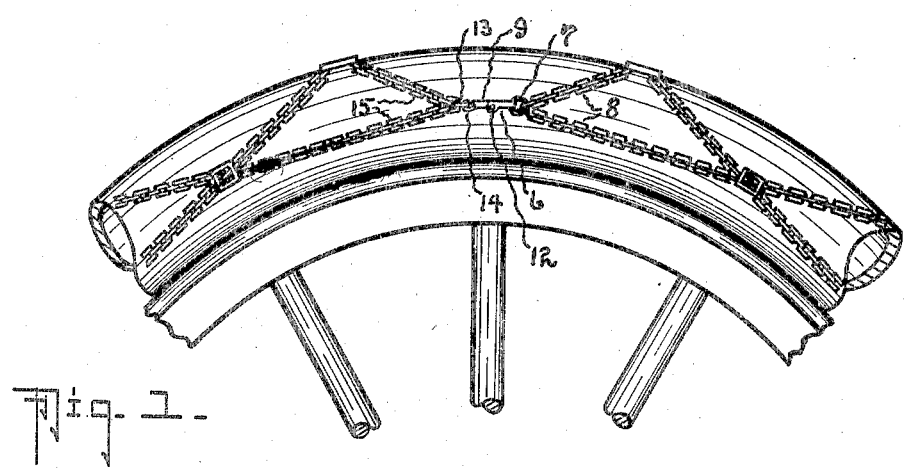
Fig. 1.
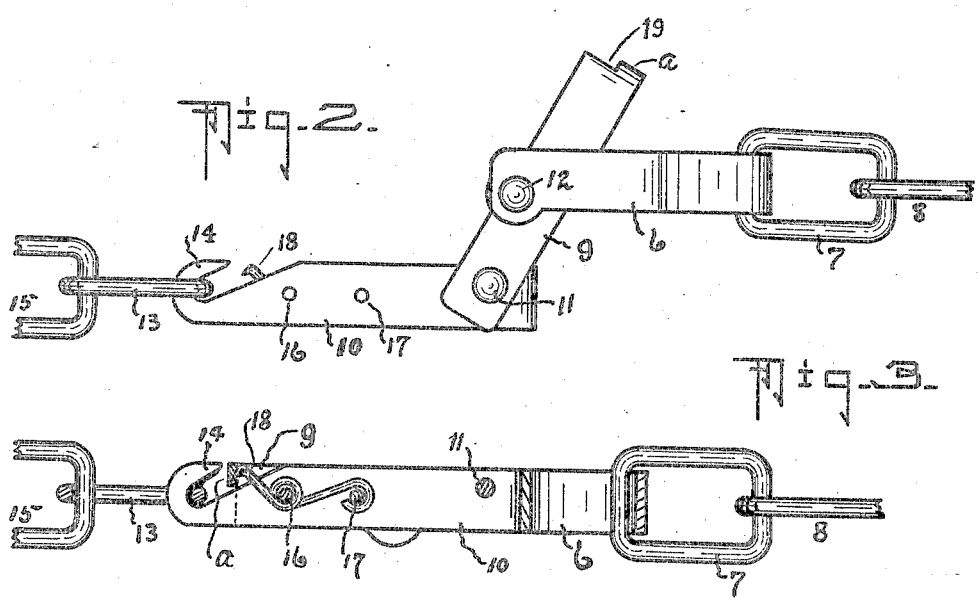
Fig. 2.
Fig. 3.
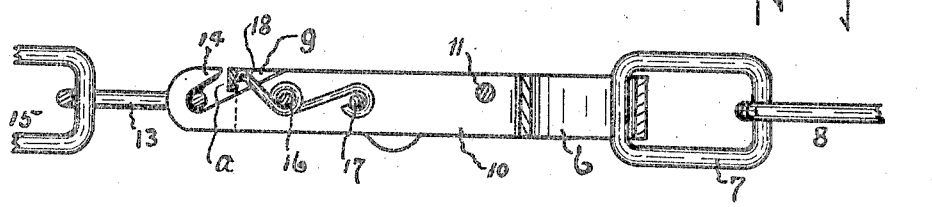
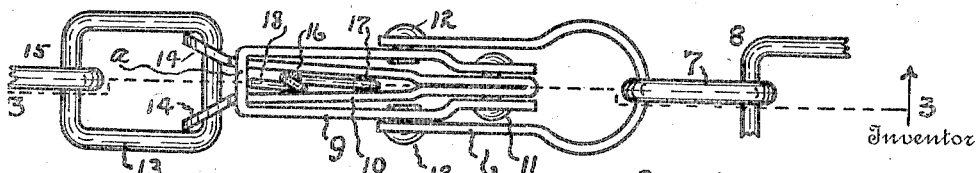
Fig. 4.
Fig. 5.
Inventor
David H. Weir,
By
Hiram A. Sturges
Attorney

UNITED STATES PATENT OFFICE.

DAVID H. WEIR, OF OMAHA, NEBRASKA.

CHAIN-LOCK.

1,291,312. Specification of Letters Patent. Patented Jan. 14, 1919.

Application filed August 27, 1917. Serial No. 188,316.

*To all whom it may concern:*

Be it known that I, DAVID H. WEIR, a citizen of the United States, residing at Omaha, in the county of Douglas and State of Nebraska, have invented certain new and useful Improvements in Chain-Locks, of which the following is a specification.

This invention relates to a chain-locking device, particularly useful for connecting the adjacent ends of anti-skid chains of wheel tires, and has for its object, broadly, to provide such a construction that, when applied, it will not become detached from vibration or other causes incident to its use, and will cause the ends of the chains to move toward each other a limited distance during the operation of locking, so that the chains will not lie slack or loose upon the tire. The invention includes such a pivotal connection for the chain-loop with the locking-loop that the stresses, during use, operate to automatically maintain the locking-loop in locked relation with the hooks of the gripping-loop, and includes features relating to convenience in use and manufacture as well as durability, all to be particularly described hereinafter, and as illustrated in the accompanying drawing, wherein,—

Figure 1 is a broken away view showing a part of a vehicle tire, an anti-skid chain and one of the chain-locks. Fig. 2 is a side view of the chain-lock, the parts being disposed in unlocked relation. Fig. 3 is a sectional view on line 3—3 of Fig. 4. Fig. 4 is a plan view of the device, showing the parts in locked relation. Fig. 5 is a view of the outer end of the locking-loop.

Referring now to the drawing for a more particular description, I provide an element 6 consisting of a metallic strip bent midway between its ends to a loop-form and designated in the claims as a chain-loop, since it is carried by the link 7 of the chain 8. Numeral 9 indicates a locking-loop, and at 10 is indicated a gripping-loop, the three loops mentioned, being elongated and substantially of U-shape.

The locking-loop 9 is pivotally mounted at its inner ends, as indicated at 11 upon the inner end of the gripping-loop 10, and is pivotally mounted, as indicated at 12, between its ends, upon the inner ends of the chain-loop 6.

The gripping-loop 10 is provided with a pair of outwardly divergent hooks 14, preferably of elastic material, adapted to engage a link 13 of the opposite end of the chain 8, or of a second chain 15. The gripping-loop 10 is provided with rivets 16 and 17, upon which is mounted a spring-catch 18.

The loop 9 is designated as a locking-loop for the reason that its outer, angular end is suitably incised to provide a recess 19 and a barrier-plate *a*, and when the parts are disposed in locked relation, as shown in Figs. 3 and 4, it is obvious that the plate *a* will be disposed very near to the free ends of the hooks 14 to prevent disengagement of the link 13 therefrom, the sides of said loop 9 being disposed at the sides of the loop 10.

During operation, when the parts are disposed as last described, longitudinal stresses directed to the device by the draft applied to the chains, will operate to normally maintain the plate *a* in engagement with the hooks 14 or with those parts of the loop 10 adjacent to the hooks, for the reason that the pivot 12 will then be disposed in non-alinement with the hooks 14 and pivot 11.

The device obviously may be used for many other purposes than as described, but will be particularly appreciated by users of non-skid chains. It is employed in pairs, at opposite sides of a tire; and in operation, the parts of the device being suitably extended as shown in Fig. 2, the chain-loop being mounted upon a link 7, the hooks 14 are manually placed in engagement with a link 13, said links being parts of different chains, or links of one chain to be connected. By forcibly causing a swinging movement of the link 9 in a direction of the link 13, said loop operating as a rock-lever, the chains or the ends thereof may be drawn toward each other to cause the chains to be pressed against the tire.

When the parts are disposed as shown in Figs. 3 and 4, they will be maintained in stationary relation or "locked" since the catch 18 will engage the plate *a*, and in addition thereto, the pivotal mounting 12 will be disposed in non-alinement with the hooks and the pivotal mounting 11, as above explained.

When it is desired to remove the chains from the tire, the loops 9 of the two chain-locks are forcibly swung outwardly from the loops 10, against the force of the spring-catches 18, or other resistance, this being accomplished manually or by use of a suitable implement, the plates *a* thereby being removed from the hooks, and since the chains will then hang loosely on the tire, the hooks 14 may be detached from the links of the chains.

With reference to the tendency for the parts of the device to remain in locked relation, during use, it should be stated that the stresses occasioned by the two ends of a chain or two chains which are connected by the device, will be directed to the hooks 14 and pivots 11, and in order to become unlocked, the pivots 12 must move in an arc, the center of which is the axis of pivots 11, and in moving in said arc the pivots 12 must move into alinement with the hooks and pivots 11, which would be against the force of the stresses. Therefore the plate *a* will operate to maintain the parts in locked relation without the aid of the catch 18, unless said plate, together with loop 9, is displaced by accidental causes. By use of the catch, however, it is considered that displacements, during use, will not occur.

What I claim as my invention, and desire to secure by Letters Patent is,—

1. In a locking device for connecting chain links, a locking-loop having a terminal barrier-plate, a chain-loop engaging a chain-link and having its ends pivotally connected with the locking-loop, a gripping-loop provided at its ends with hooks and adapted to engage a chain-link, said last named loop being pivotally mounted upon the locking-loop outwardly of the pivotal connection of the chain-loop to permit the locking-loop to have a swinging movement for disposing its terminal barrier-plate adjacent to the hooks of the gripping-loop and for moving the chain-links toward each other.

2. In a locking device for connecting chain-links, a loop, a second loop, a third loop, said loops being substantially of U-shape in plan, the first named loop having a recess formed therein to provide a barrier-plate at its closed end, the second loop being pivotally mounted on the first named loop and adapted to engage a chain-link, said third loop being provided with hooks for engaging the link of a chain, and having a pivotal mounting on that part of the first named loop outwardly of the pivotal mounting of the second loop to permit the first named loop to move in an arc for disposing its barrier-plate adjacent to the hooks of the third loop and for moving the chain-links toward each other.

3. In a locking device for connecting chain-links, a locking-loop having a terminal barrier-plate, a chain-loop engaging a chain-link and having its ends pivotally mounted upon the locking-loop, a gripping-loop provided at its ends with hooks and adapted to engage a chain-link, said last named loop being pivotally mounted upon the locking-loop to permit said locking-loop to have a swinging movement for moving the chain-links toward each other and to dispose its terminal barrier-plate adjacent to the hooks of the gripping-loop, the pivotal mounting of the chain-loop with the locking-loop moving beyond a right line between said hooks and the pivotal mounting of the gripping-loop upon the locking-loop.

4. In a locking device for connecting chain-links, a locking-loop having a terminal barrier-plate, a chain-loop adapted to engage a chain-link and having its ends pivotally mounted upon the locking-loop, a gripping-loop provided at its ends with hooks and adapted to engage a chain-link, said last named loop being pivotally mounted upon the locking-loop to permit said locking-loop to have a swinging movement for moving the chain-links toward each other and to dispose its pivotal mounting with the chain-loop in line with said hooks and its pivotal connection with the gripping-loop during a part of said swinging movement and to dispose its said pivotal mounting with the chain-loop beyond said line at the termination of said swinging movement, the barrier-plate of said locking-loop being disposed adjacent to said hooks.

5. In a locking device for connecting chain-links, a locking-loop having a terminal barrier-plate, a chain-loop engaging a chain-link and having its ends pivotally connected with the locking-loop, a gripping-loop having a catch mounted non-rotatively thereon and having terminal hooks for engaging a chain-link, said gripping-loop being pivotally mounted upon the locking-loop outwardly of the pivotal mounting of the chain-loop to permit said locking-loop to have a swinging movement to cause a movement of the chain-links toward each other and to automatically dispose its terminal barrier-plate in engagement with the catch, intermediate said catch and the hooks of said gripping-loop.

In testimony whereof, I have affixed my signature in presence of two witnesses.

DAVID H. WEIR.

Witnesses:
HIRAM A. STURGES,
E. WHITMORE.